(12) United States Patent
Moreno et al.

(10) Patent No.: US 10,469,381 B2
(45) Date of Patent: Nov. 5, 2019

(54) LOCALIZATION OF GROUP BASED POLICIES IN A DEMAND BASED OVERLAY NETWORK

(71) Applicant: Cisco Technology, Inc., San Jose, CA (US)

(72) Inventors: Victor M. Moreno, Carlsbad, CA (US); Sanjay Kumar Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 15/220,441

(22) Filed: Jul. 27, 2016

(65) Prior Publication Data

US 2018/0034732 A1    Feb. 1, 2018

(51) Int. Cl.
*H04L 12/741* (2013.01)
*H04L 12/749* (2013.01)
*H04L 12/813* (2013.01)

(52) U.S. Cl.
CPC .......... *H04L 45/745* (2013.01); *H04L 45/741* (2013.01); *H04L 47/20* (2013.01)

(58) Field of Classification Search
CPC ....... H04L 45/745; H04L 47/20; H04L 45/02; H04L 45/64; H04L 61/6059; H04L 61/2007; H04L 61/6022; H04L 45/741; G06F 17/30312
See application file for complete search history.

(56) References Cited

U.S. PATENT DOCUMENTS

| | | | | |
|---|---|---|---|---|
| 8,792,353 | B1* | 7/2014 | Janarthanan | H04L 47/10 370/236 |
| 8,793,361 | B1* | 7/2014 | Riddle | H04L 47/2441 709/224 |
| 9,246,825 | B2* | 1/2016 | Jilani | H04L 47/2416 |
| 9,252,972 | B1* | 2/2016 | Dukes | H04L 12/569 |
| 9,276,877 | B1* | 3/2016 | Chua | H04L 45/02 |
| 9,438,564 | B1* | 9/2016 | Weng | H04L 63/0281 |
| 9,654,385 | B2* | 5/2017 | Chu | H04L 45/245 |
| 9,686,180 | B2* | 6/2017 | Chu | H04L 45/28 |
| 9,860,790 | B2* | 1/2018 | Khan | H04W 28/10 |
| 9,898,317 | B2* | 2/2018 | Nakil | G06F 9/45558 |
| 2003/0012197 | A1* | 1/2003 | Yazaki | H04L 47/10 370/392 |
| 2008/0228932 | A1* | 9/2008 | Monette | H04L 47/10 709/229 |

(Continued)

*Primary Examiner* — Tejis Daya
(74) *Attorney, Agent, or Firm* — Merchant & Gould P.C.

(57) ABSTRACT

A first network device may receive a frame from a first client device that may be destined for a second client device. Then a request may be sent to a network control plane of a network by the first network device in response to receiving the frame. The request may be for information on reachability for the second client device and may comprise an identifier of the second client device and first metadata corresponding to the first client device. The first network device may receive, from the network control plane, in response to sending the request, a policy rule-set for a flow corresponding to the frame and for a location of the second client device. The network control plane may use the identifier of the second client device and the first metadata as keys to lookup the location of the second client device and the policy rule-set.

20 Claims, 3 Drawing Sheets

(56) References Cited

U.S. PATENT DOCUMENTS

| | | | |
|---|---|---|---|
| 2010/0199324 A1* | 8/2010 | Tanner | H04L 63/065 726/1 |
| 2011/0185049 A1* | 7/2011 | Atreya | H04W 12/08 709/222 |
| 2011/0306364 A1* | 12/2011 | Gossain | H04L 12/5692 455/456.6 |
| 2012/0140620 A1* | 6/2012 | Hogan | H04L 41/0893 370/230 |
| 2013/0163594 A1* | 6/2013 | Sharma | H04L 45/64 370/392 |
| 2014/0269702 A1* | 9/2014 | Moreno | H04L 45/64 370/390 |
| 2015/0019746 A1* | 1/2015 | Shatzkamer | H04L 65/1069 709/228 |
| 2015/0026794 A1* | 1/2015 | Zuk | H04L 63/0227 726/13 |
| 2015/0071289 A1* | 3/2015 | Shin | H04L 45/745 370/392 |
| 2015/0124606 A1* | 5/2015 | Alvarez | H04W 28/085 370/235 |
| 2016/0080263 A1* | 3/2016 | Park | G06F 17/30345 370/392 |
| 2016/0308905 A1* | 10/2016 | Stiekes | H04L 47/20 |
| 2017/0026422 A1* | 1/2017 | Klein | H04L 67/1021 |

\* cited by examiner

US 10,469,381 B2

LOCALIZATION OF GROUP BASED POLICIES IN A DEMAND BASED OVERLAY NETWORK

TECHNICAL FIELD

The present disclosure relates generally to demand based overlay networks, in particular to localization of group based policies in a demand based overlay network.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
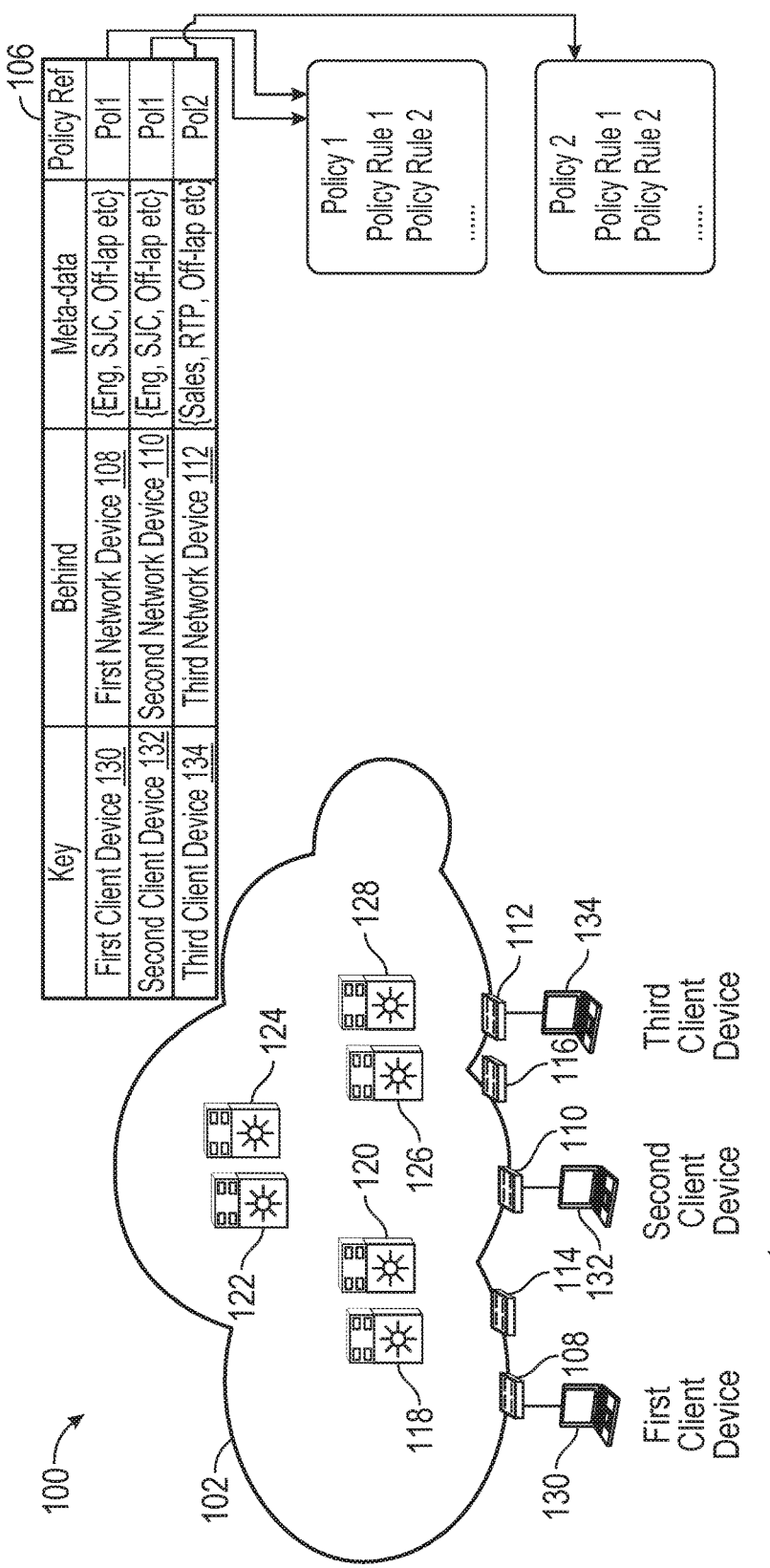
FIG. 1 shows a system for providing localization of group based policies in a demand based overlay network.

A first network device may receive a frame from a first client device that may be destined for a second client device. Then a request may be sent to a network control plane of a network by the first network device in response to receiving the frame. The request may be for information on reachability for the second client device and may comprise an identifier of the second client device and first metadata corresponding to the first client device. The first network device may receive, from the network control plane, in response to sending the request, a policy rule-set for a flow corresponding to the frame and for a location of the second client device. The network control plane may use the identifier of the second client device and the first metadata as keys to lookup the location of the second client device and the policy rule-set. The first network device may apply the policy rule-set for the flow corresponding to the frame and forward the frame to the location of the second client device according to the policy rule-set.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Group based policies articulate a provider (e.g., destination) and consumer (e.g., source) relationship governed by contracts, for example. The contract may be consumed by the consumer group based on criteria defined in the contract (who (e.g., employee group), what (e.g., access method), where (e.g., access location)). A group of consumers may be subject to different rules when accessing a provider group resource from different locations (e.g., domestic vs. international) or through different network access methods (e.g., wired vs. wireless). This could be modeled by creating different consumer groups to represent all possible combinations of employee groups+locations+access methods+ other metadata for example. Modeling this way, however, may result in each group expanding into a very large number of more specific groups reflective of the location and access method context. An example may be provided in Table 1 showing how a single group can proliferate to multiple tags.

TABLE 1

| Group | Meta-data | Tag |
| --- | --- | --- |
| ENGINEERING | San-Jose | 20 |
| | RTP | 21 |
| | Wired-San Jose | 22 |
| | Wireless-San Jose | 23 |
| | Wired-RTP | 24 |
| | Wired-RTP | 25 |
| | Officepc-Wired-SanJose | 26 |
| | Officepc-Wireless-SanJose | 27 |
| | ?.etc | . . . etc |

This proliferation of groups may not be desirable and may not be easily extensible, for example, as classification parameters are added, pre-existing groups may need to change and be re-defined. Furthermore, such a model may require endpoints to re-authenticate every time their context changes (e.g., location, network access method, or other), which may pose additional requirements on the authentication infrastructure.

FIG. 1 shows a system 100 consistent with embodiments of the disclosure for providing localization of group based policies in a demand based overlay network. As shown in FIG. 1, system 100 may comprise a network 102, a plurality of client devices 104, and a host database 106. Network 102 may comprise a first network device 108, a second network device 110, a third network device 112, a fourth network device 114, a fifth network device 116, a sixth network device 118, a seventh network device 120, an eighth network device 122, a ninth network device 124, a tenth network device 126, and an eleventh network device 128. Plurality of client devices 104 may comprise a first client device 130, a second client device 132, and a third client device 134. The network devices in network 102 may comprise, but are not limited to, switches and routers for example. Network 102 may comprise any number of network devices and is not limited to eleven. Plurality of client devices 104 may comprise any number of client devices and is not limited to three. Each of plurality of client devices 104 may comprise any type device wishing to communicate over network 102. For example, each of plurality of client devices 104 may comprise, but are not limited to, a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Network 102 may comprise an enterprise fabric. The enterprise fabric may comprise an underlay and an overlay. The underlay may deal with connectivity between fabric elements (e.g., network devices) and the overlay may deal with user traffic entering the fabric. Traffic may enter the enterprise fabric through fabric edge nodes (e.g., first network device 108, second network device 110, third network device 112, fourth network device 114, and fifth network device 116). The fabric edge nodes may be responsible for encapsulating a packet with a fabric header that contains an egress fabric edge node address. When a packet (e.g., frame) arrives at the egress fabric edge node, a fabric header may be stripped off and the native packet may be forwarded according to an inner address. The enterprise fabric may be capable of providing layer-2 and layer-3 services on top of the underlay. The enterprise fabric may have end-points (e.g., plurality of client devices 104) connected to it.

Consistent with embodiments of the disclosure, a control plane (e.g., in the overlay of the enterprise fabric) of network 102 may track the location of endpoints (i.e., hosts connected to the enterprise fabric). The end endpoints tracked by the control plane may comprise first client device 130, second client device 132, and third client device 134. First client device 130, second client device 132, and third client device 134 may each have an identifier, for example, a media access control (MAC) address, an internet protocol (IP) (e.g., IPv4 or IPv6) address, or any other identifier for the client device connected to the enterprise fabric. First client device 130 (e.g., with IP address 10.1.1.1) may be behind first network device 108, second client device 132 (e.g., with IP address 10.1.1.2) may be behind second network device 110, and third client device 134 (e.g., with IP address 20.1.1.1) may be behind third network device 112.

When data traffic enters network 102, the ingress fabric edge node (e.g., one of first network device 108, second network device 110, third network device 112, fourth network device 114, and fifth network device 116) may be aware of the location context meta-data for the source of the traffic (e.g., one of plurality of client devices 104), but not the destination. In addition, the policy information distributed to ingress fabric edge nodes may be either all the entries or just the entries that are relevant to the groups present on the particular ingress fabric edge node. For example, first network device 108 may have the policy entries related to the groups that are connected to first network device 108.

Embodiments of the disclosure may use the control plane to store the policies and location context meta-data. Policies may be registered with the control plane as the host (e.g., client device) joins network 102. When a network element (e.g., first network device 108, second network device 110, third network device 112, fourth network device 114, or fifth network device 116) makes a request of a destination along with the associated location context meta-data for the requesting source, the control plane may analyze the meta-data and may send the appropriate policy rules along with the information on how to reach the destination.

Figure 2:
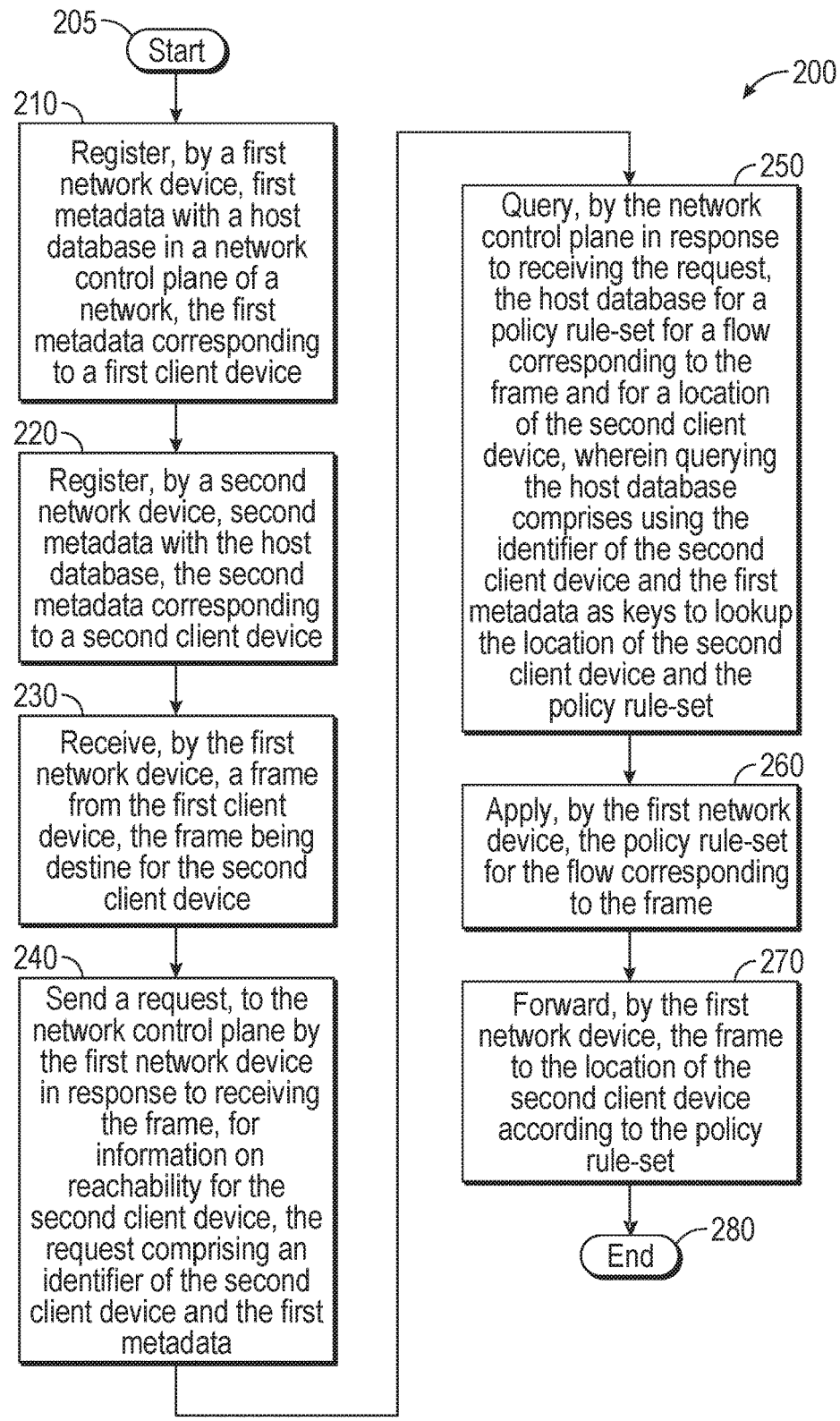
FIG. 2 is a flow chart of a method for providing localization of group based policies in a demand based overlay network.

FIG. 2 is a flow chart setting forth the general stages involved in a method 200 consistent with an embodiment of the disclosure for providing localization of group based policies in a demand based overlay network. Method 200 may be implemented using system 100 as described in detail above with respect to FIG. 1. Ways to implement the stages of method 200 will be described in greater detail below.

Method 200 may begin at starting block 205 and proceed to stage 210 where first network device 108 may register first metadata with host database 106 in the network control plane of network 102. The first metadata may correspond to first client device 130. For example, the first metadata may comprise location context metadata for first client device 130. From stage 210, where first network device 108 registers the first metadata, method 200 may advance to stage 220 where second network device 110 may register second metadata with host database 106. The second metadata may correspond to second client device 132. For example, the second metadata may comprise location context metadata for second client device 132.

In other words, plurality of client devices 104 (e.g., first client device 130, second client device 132, and third client device 134) may join network 102 and attach to first network device 108, second network device 110, and third network device 112, respectively. Each of these edge network devices may register the respective client with the control plane. The registration may include the policy definition for different values of source location context metadata. At this point the initial information may be populated in host database 106 of the overlay control plane.

For example, as shown in host database 106 of FIG. 1, first client device 130 may be behind first network device 108 and may have the first metadata comprising an employee group of engineering, a location of SJC, and may have connected wirelessly via a laptop computer. For this client device (i.e., first client device 130) having this metadata, a corresponding policy rule-set of Policy 1 may be assigned having one or more policy rules. Second client device 132 may be behind second network device 110 and may have second metadata comprising an employee group of engineering, a location of SJC, and may have connected wirelessly via a laptop computer. For this client device (i.e., second client device 132) having this metadata, a corresponding policy rule-set of Policy 1 may be assigned having one or more policy rules. Because first client device 130 and second client device 132 may have the same or similar metadata, the same policy may be assigned to both.

Third client device 134 may be behind third network device 112 and may have first metadata comprising an employee group of sales, a location of RTP, and may have connected wirelessly via a laptop computer. For this client device (i.e., third client device 134) having this metadata, a corresponding policy rule-set of Policy 2 may be assigned having one or more policy rules. Because third client device 134 may have metadata different from first client device 130 and second client device 132, a different policy may be assigned to third client device 134.

Once second network device 132 registers the second metadata in stage 220, method 200 may continue to stage 230 where first network device 108 may receive a frame from first client device 130. For example, the frame may be destined for second client device 132. At this point, first network device 108 may not know about the location and other information for second client device 132. The frame may indicate that it needs to go to second client device 132.

After first network device 108 receives the frame in stage 230, method 200 may proceed to stage 240 where first network device 108 may send a request to the network control plane in response to receiving the frame. The request may be for information on reachability for second client device 132 and may comprise an identifier of second client device 132 and the first metadata (e.g., location context meta-data about first client device 130). The identifier of second client device 132 may comprise a media access control (MAC) address, an internet protocol (IP) (e.g., IPv4 or IPv6), or any other identifier for second client device 132 connected to the enterprise fabric. For example, first network device 108 may issue a request for information on reachability for second client device 132. As part of the request for reachability information, first network device 108 may also send location context metadata about the source of the traffic (i.e., first client device 130).

Consistent with embodiments of the disclosure, network 102 may have visibility into location context meta-data for client devices that connect to network 102. In other words, the metadata (i.e., the location context metadata) may be intrinsic or otherwise obtained intrinsically by network 102. For example, by virtue of first client device 130 connecting to first network device 108, first network device 108 may know where and how first client device 130 connected to network 102. Likewise, by virtue of second client device 132 connecting to second network device 110, second network device 110 may know where and how second client device 132 connected to network 102. Location context metadata for client devices that connect to network 102 may comprise, but are not limited to, a country from which client device connected, if a client device connected to a trusted portion of network 102, whether a client device connected from home, whether a client device connected wirelessly or via a wired connection, if a client device connected via a cellular telephone, or if a client device connected inside or outside a firewall on network 102, for example. Regardless, uber rules may be applied to the communications between client devices communicating over network 102 based on groups associated with the client devices. Uber rules may be, but are not limited to, rules that are based on a function a user has with an enterprise managing or having authority over network 102. For example, first client device 130 and second client device 132 may be associated with an engineering employment group with in the enterprise while third client device 134 may be associated with a sales employment group with in the enterprise. The employment groups may comprise any type employment group and are not limited to engineering and sales.

From stage 240, where first network device 108 sends the request to the network control plane, method 200 may advance to stage 250 where the network control plane may query, in response to receiving the request, host database 106 for a policy rule-set for a flow corresponding to the frame and for a location of second client device 132. Querying host database 106 may comprise using the identifier of second client device 132 and the first metadata as keys to lookup the location of second client device 132 and the policy rule-set. For example, the control plane may receive the request and may use the destination address (e.g., the identifier of second client device 132) and the source location context metadata (e.g., the first metadata) as keys to lookup information regarding reachability and policy rule-set for the particular flow that triggered the request from first client device 130. The control plane may reply to first network device 108 with relevant portion of the policy rule-set after matching on source location context meta-data information and location of second client device 132 (i.e., destination information).

After the network control plane queries host database 106 in stage 250, method 200 may proceed to stage 260 where first network device 108 may apply the policy rule-set for the flow corresponding to the frame. From stage 260, where first network device 108 applies the policy rule-set, method 200 may advance to stage 270 where first network device 108 may forward the frame to the location of second client device 132 according to the policy rule-set. In the above example, the location of second client device 132 may comprise second network device 110. Once first network device 108 forwards the frame in stage 270, method 200 may then end at stage 280.

By using the aforementioned process, policies may be given source location semantics without having to multiply the number of groups required to express these location aware policies. Embodiments of the disclosure may provide a process that enables localization of policy for a consumer group without requiring the proliferation of new groups and without requiring new data plane classification mechanisms in the network. The process may also enable the selective distribution and enforcement of scope specific policy rule-sets based on location context metadata such as location or network access method.

Figure 3:
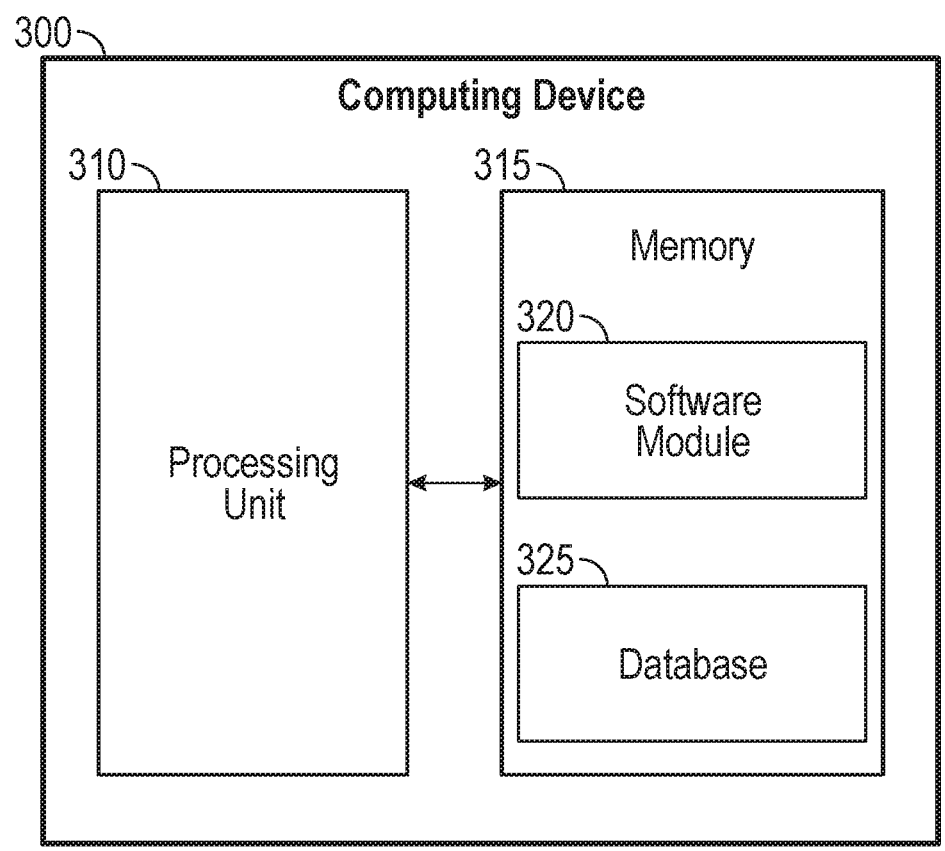
FIG. 3 shows a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for providing localization of group based policies in a demand based overlay network, including for example, any one or more of the stages from method 200 described above with respect to FIG. 2. Computing device 300, for example, may provide an operating environment for the network devices of network 102 on any of plurality of client devices 104. The network devices of network 102 and plurality of client devices 104 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. Furthermore, computing device 300 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    registering, by a first network device, first metadata with a host database in a network control plane of a network, the first metadata corresponding to a first client device, the first metadata comprising location context metadata and being derived by the first network device based on how and from where the first client device connected to the first network device;
    registering, by a second network device, second metadata with the host database, the second metadata corresponding to a second client device;
    receiving, by the first network device, a frame from the first client device via an overlay network, the frame being destined for the second client device;
    sending a request, over an underlay network to the network control plane by the first network device in response to receiving the frame over the underlay network, for information on reachability for the second client device, the request comprising an identifier of the second client device and the first metadata;
    querying, by the network control plane in response to receiving the request, the host database for a policy rule-set for a flow corresponding to the frame and for a location of the second client device, wherein querying the host database comprises using the identifier of the second client device and the first metadata as keys to lookup the location of the second client device and the policy rule-set;
    applying, by the first network device, the policy rule-set for the flow corresponding to the frame; and
    forwarding, by the first network device, the frame to the location of the second client device according to the policy rule-set.

2. The method of claim 1, wherein registering the first metadata comprises registering the first metadata comprising information that is intrinsic to the network.

3. The method of claim 1, wherein registering the second metadata comprises registering the second metadata comprising information that is intrinsic to the network.

4. The method of claim 1, wherein registering the second metadata comprises registering the second metadata comprising information corresponding to at least one of the following: a location where the second client device attached to the network and an attachment method used by the second client device to attach to the network.

5. The method of claim 1, wherein registering by the first network device comprises registering by the first network device comprising a first edge node on the network.

6. The method of claim 1, wherein registering by the second network device comprises registering by the second network device comprising a second edge node on the network.

7. The method of claim 1, wherein sending the request comprising the identifier of the second client device comprises sending the request comprising the identifier comprising at least one of the following: a media access control (MAC) address of the second client device and an internet protocol (IP) address of the second client device.

8. The method of claim 1, wherein forwarding the frame to the location of the second client device comprises forwarding the frame to the location comprising the second network device.

9. A method comprising:
receiving, by a first network device, a frame from a first client device over an overlay network, the frame being destined for a second client device;
sending a request, over an underlay network to a network control plane of a network by the first network device in response to receiving the frame over the overlay network, for information on reachability for the second client device, the request comprising an identifier of the second client device and first metadata corresponding to the first client device, the first metadata comprising location context metadata and being derived by the first network device based on how and from where the first client device connected to the first network device;
receiving, by the first network device from the network control plane in response to sending the request, a policy rule-set for a flow corresponding to the frame and for a location of the second client device, the network control plane using the identifier of the second client device and the first metadata as keys to lookup the location of the second client device and the policy rule-set;
applying, by the first network device, the policy rule-set for the flow corresponding to the frame; and
forwarding, by the first network device, the frame to the location of the second client device according to the policy rule-set.

10. The method of claim 9, wherein sending the request comprising the identifier of the second client device and the first metadata corresponding to the first client device comprises sending the request wherein the first metadata comprises information that is intrinsic to the network.

11. The method of claim 9, further comprising registering, by the first network device, the first metadata with the host database in the network control plane of the network.

12. The method of claim 9, further comprising registering, by the second network device, second metadata with the host database, the second metadata corresponding to the second client device.

13. The method of claim 9, wherein sending the request comprising the identifier of the second client device comprises sending the request comprising the identifier comprising at least one of the following: a media access control (MAC) address of the second client device and an internet protocol (IP) address of the second client device.

14. The method of claim 9, wherein forwarding the frame to the location of the second client device comprises forwarding the frame to the location comprising the second network device.

15. An apparatus comprising:
a memory storage; and
a processing unit coupled to the memory storage, wherein the processing unit is operative to:
receive a frame from a first client device over an overlay network, the frame being destined for a second client device,
send a request, over an underlay network to a network control plane of a network in response to receiving the frame over the overlay network, for information on reachability for the second client device, the request comprising an identifier of the second client device and first metadata corresponding to the first client device, the first metadata comprising location context metadata and being derived by the apparatus based on how and from where the first client device connected to the first network device,
receive, from the network control plane in response to sending the request, a policy rule-set for a flow corresponding to the frame and for a location of the second client device,
apply the policy rule-set for the flow corresponding to the frame, and
forward the frame to the location of the second client device according to the policy rule-set.

16. The apparatus of claim 15, wherein the first metadata comprises information that is intrinsic to the network.

17. The apparatus of claim 15, wherein the location of the second client device comprises the second network device.

18. The method of claim 1, wherein the location context metadata comprises one of the following: a country from which the first client device connected, that the first client device connected to a trusted portion of a network, that the first client device connected from a home, that the first client device connected wirelessly, that the first client device connected via a wired connection, that the first client device connected via a cellular telephone, that the first client deice connected inside a firewall, and that the first client device connected outside the firewall.

19. The method of claim 9, wherein the location context metadata comprises one of the following: a country from which the first client device connected, that the first client device connected to a trusted portion of a network, that the first client device connected from a home, that the first client device connected wirelessly, that the first client device connected via a wired connection, that the first client device connected via a cellular telephone, that the first client deice connected inside a firewall, and that the first client device connected outside the firewall.

20. The apparatus of claim 15, wherein the location context metadata comprises one of the following: a country from which the first client device connected, that the first client device connected to a trusted portion of a network, that the first client device connected from a home, that the first client device connected wirelessly, that the first client device connected via a wired connection, that the first client device connected via a cellular telephone, that the first client deice connected inside a firewall, and that the first client device connected outside the firewall.

* * * * *